T. F. CARVER.

Assignor of one-half to M. F. McMahon.

FRICTION CLUTCH.

No. 10,365. Reissued Aug. 14, 1883.

Witnesses;
Albert A. Barker,
Walter B. Source.

Inventor;
Thomas F. Carver.

UNITED STATES PATENT OFFICE.

THOMAS F. CARVER, OF WORCESTER, MASSACHUSETTS, ASSIGNOR OF ONE-HALF TO MICHAEL F. McMAHON, OF SAME PLACE.

FRICTION-CLUTCH.

SPECIFICATION forming part of Reissued Letters Patent No. 10,365, dated August 14, 1883.

Original No. 239,933, dated April 12, 1881. Application for reissue filed May 26, 1883.

*To all whom it may concern:*

Be it known that I, THOMAS F. CARVER, of Worcester, in the county of Worcester and State of Massachusetts, have invented certain new and useful Improvements in Friction-Clutches; and I do hereby declare that the following is a full, clear, and exact description of the same, reference being had to the accompanying drawings, forming a part of this specification, and in which—

Figure 1:
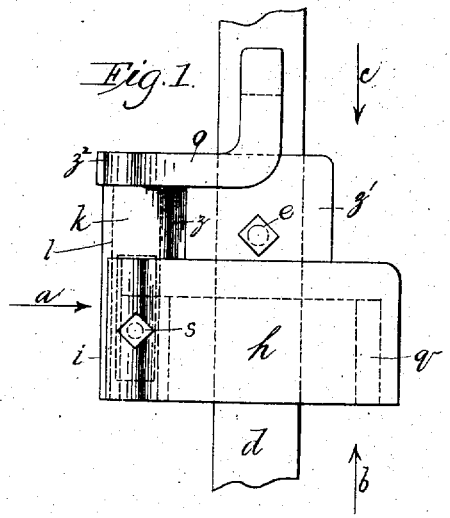
Figure 2:
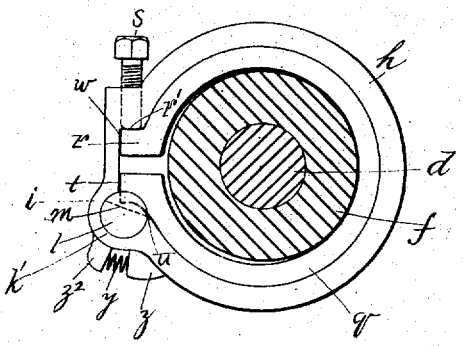
Figure 3:
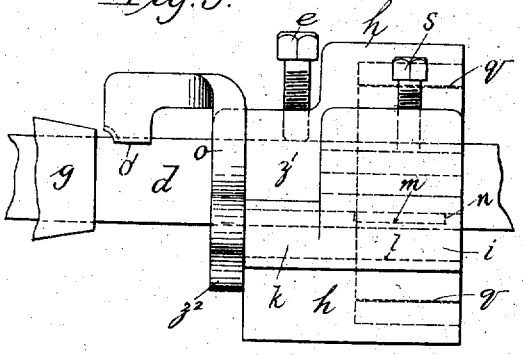
Figure 4:
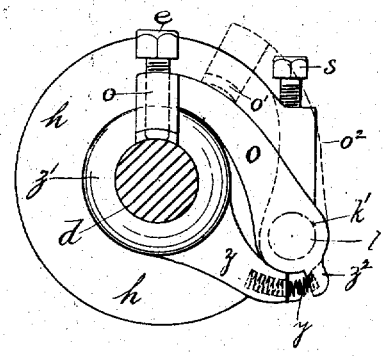
Figure 5:
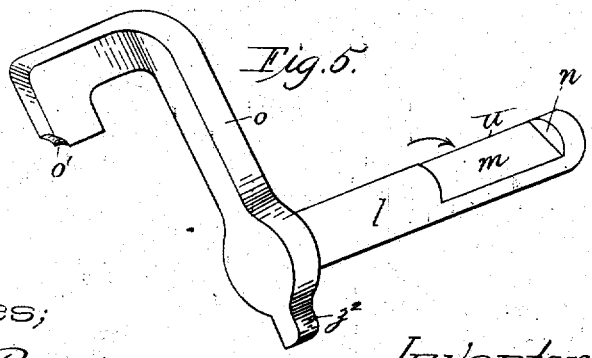

Figure 1 represents a top or plan view of one of my aforesaid improved friction-clutches applied to a shaft. Fig. 2 represents a side view of said clutch, shown in Fig. 1, looking in the direction indicated by arrow *a*, same figure. Fig. 3 represents an end view of the clutch, showing the shaft and a pulley-hub in cross-section, looking in the direction indicated by arrow *b*, Fig. 1. Fig. 4 represents an opposite end view of the clutch from that shown in Fig. 3. Fig. 5 represents, upon an enlarged scale, a portion of the device in perspective, which will be hereinafter more fully described.

To enable those skilled in the art to which my invention belongs to make and use the same, I will proceed to describe it more in detail.

In the drawings, *d* represents a horizontal driving-shaft, upon which the clutch is secured by means of a set-screw, *e*, or otherwise.

The part marked *f* represents, in cross-section, the hub of a pulley, which is arranged to turn on shaft *d*; and *g*, the end of the cone of the shipper, by means of which and a suitable lever connected therewith the clutch is clutched and unclutched to or from hub *f*.

Upon the shell or box part *h* of the device is formed a projection, *i*, which extends back to form the hub *k*. Through said part *i* of shell *h* and hub *k* is formed a round longitudinal opening, *k'*, to receive a short rocking shaft or journal, *l*. Said journal *l* is provided with an operating-lever, *o*, by means of which it is turned a partial revolution, as hereinafter described, by the inclined surface *g* of the shipper-cone coming against the end *o'* of said lever when the shipper is forced toward the clutch in shipping the power to the pulley. One side of the journal *l* is cut away nearly to its center for a short distance from its inner end, as shown at *m* in Figs. 3 and 5, to form a cam-surface at the edge or corner *u* and a holding-shoulder, *n*, near the end, the purpose of which will be hereinafter described.

A slotted friction-ring, *q*, is arranged and fitted inside of the shell part *h* of the device, which is provided at each side of its slot with ears *r t*, which fit into a recess, *w*, formed in said shell part *h*.

In fitting the parts together, the cam-shaft or journal *l* is first inserted in the opening *k'*, before described, as shown in the drawings, when the friction-ring *q* is then placed in position; and to accomplish this its two ends are sprung together a sufficient distance to admit of the projection *t* being slipped over the end of the cam-spindle in front of and bearing against the shoulder *n*, which holds said ring in its proper position when thus fitted in place.

The friction-ring *q* is contracted, so as to clutch and hold upon the surface of the hub of the pulley, and thus impart the driving-power to the same by turning the cam-shaft, as before described, by the operation of the shipping-lever of the shipper, which causes the corner *u* of said cam-shaft to bear against and force up the end *t* of said ring, its other end, *r*, being held rigid by bearing against the shoulder *r'* of shell part *h*, or the lower end of a set-screw, *s*, arranged to turn up and down in said shell part. The purpose of set-screw *s* is to take up the wear caused by the friction upon the inner surface of the ring by turning it down against the projection *r*, as necessity requires, to produce a proper friction by the operation of the cam-shaft. When the clutch is new, the projection *r* would usually bear against the shoulder *r'*; but as the ring is worn down the set-screw would be correspondingly turned down, as before described.

The lever *o* is represented by full lines in the drawings in the position that it occupies when the device is unclutched from the pulley, and by dotted lines *o²* in Fig. 4 when clutched to said pulley. When the shipper is forced back from lever *o*, said lever is also sprung back (from its position shown by dotted lines to that shown by full lines, with its end *o'* against the surface of shaft *d*, so as to allow the friction-ring *q* to expand and release the pulley) by means of a spiral spring, *y*, said operation also being facilitated by the expansion of the ring itself, which, bearing against the corner *u* of the cam-shaft *l*, tends to turn said shaft back as fast as the pressure upon the outer end of lever *o* is released. The spiral spring *y* is held in sockets formed in the projecting part *z* of hub *z'*, formed on the shell part *h*, and in the projection $z^2$, formed on the inner end of lever *o*. Any other similar spring device may be employed for the purpose, if preferred, and the form or shape of the various parts of the device may be varied to conform to different sizes of shafts, pulleys, and shippers.

By my invention of employing a cam-shaft, as described, I am enabled to obtain a firm, strong pressure upon the friction-ring *q*—with but little pressure upon the shipping-lever—said lever being very easily moved in shipping or unshipping the power to or from a pulley to which the clutch is arranged, even when said clutch and pulley are of large size. I thereby obviate the employment of a long leverage, such as is commonly adopted in similar friction-clutches, and which is one of the principal objections in their construction.

As will be observed by those skilled in the art to which my invention appertains, my improved clutch is composed of few, simple, and strong parts that are not liable to get out of repair, except by long and continued usage.

Having described my improvements in friction-clutches, what I claim therein as new and of my invention, and desire to secure by Reissue Letters Patent, is—

1. In a friction-clutch, a cam-shaft recessed or cut out to form a cam part for operating the friction-ring, substantially as shown and described.

2. The combination of the projecting parts or flanges *r t* of friction-ring *q* with cam part *m* on shaft or spindle *l*, adjusting or set screw *s*, and box part or shell *h*, substantially as and for the purposes set forth.

3. The combination, with friction-ring *q*, provided with projections *r t*, of box or shell *h*, set-screw *s*, shaft or spindle *l*, provided with cam part *m* and shoulder *n*, cam-lever *o*, provided with projection $z^2$, spring *y*, and bearing-hub *z* on hub *z'*, all constructed and arranged to operate substantially as shown and described, for the purpose stated.

THOMAS F. CARVER.

Witnesses:
ALBERT A. BARKER,
WALTER B. NOURSE.